(12) United States Patent
Kessler

(10) Patent No.: US 8,715,438 B2
(45) Date of Patent: May 6, 2014

(54) GIMBAL PRESS

(75) Inventor: Patrick Kessler, San Francisco, CA (US)

(73) Assignee: Apple Inc., Cupertino, CA (US)

(*) Notice: Subject to any disclaimer, the term of this patent is extended or adjusted under 35 U.S.C. 154(b) by 179 days.

(21) Appl. No.: 13/092,529

(22) Filed: Apr. 22, 2011

(65) Prior Publication Data
US 2012/0268392 A1    Oct. 25, 2012

(51) Int. Cl.
*B29C 65/00* (2006.01)
*B32B 37/00* (2006.01)

(52) U.S. Cl.
USPC ............. 156/87; 156/228; 156/556; 156/580; 156/581; 156/582; 100/258 R; 29/622; 29/825; 29/829

(58) Field of Classification Search
USPC ............ 345/156–179; 156/87, 228, 285, 286, 156/290, 291, 292, 323, 358, 580, 581, 582, 156/583.1, 583.2, 583.3; 100/258 R; 29/825, 829, 831, 622, 25
See application file for complete search history.

(56) References Cited

U.S. PATENT DOCUMENTS

| | | | | |
|---|---|---|---|---|
| 4,033,030 A * | 7/1977 | Robinson et al. | ............... | 29/622 |
| 5,185,509 A * | 2/1993 | Todd et al. | ............... | 219/85.16 |
| 7,195,644 B2 * | 3/2007 | Diaz et al. | ............... | 623/17.13 |
| 7,413,430 B2 * | 8/2008 | Kurimura et al. | ............ | 425/405.1 |
| 2003/0000649 A1 * | 1/2003 | Barge et al. | ............... | 156/350 |
| 2009/0273573 A1 * | 11/2009 | Hotelling | ............... | 345/173 |

* cited by examiner

*Primary Examiner* — John Goff
*Assistant Examiner* — Hannuri L Kwon
(74) *Attorney, Agent, or Firm* — Womble Carlyle Sandridge & Rice LLP

(57) ABSTRACT

A computing device includes a touchpad having a plurality of internal diaphragms that allow the touchpad to sense downward force inputs. The diaphragms are evenly glued about their circumferential edge portions to an internal flat surface by way of a gimbal press. The gimbal press can include a force delivery component coupled to an upper plate having an internal depression, a lower plate having a ball bearing that accepts force from the upper plate via the internal depression, a flexible ring member, and a compliant annular component. Both plates have a plurality of interlocking features with grooves extending therethrough that accept the flexible ring member. Force is evenly distributed to the diaphragm via a gimbal effect at the ball bearing, and the flexible ring member centers the upper and lower plates with respect to each other while permitting some relative tilt and rotation between the plates.

19 Claims, 6 Drawing Sheets

GIMBAL PRESS

TECHNICAL FIELD

The present invention relates generally to the manufacture of computing or other electrical devices, and more particularly to the assembly of pressure sensing diaphragms for use in electrical devices.

BACKGROUND

Many consumer computing devices include one or more touch-based input components of some sort, such as a keyboard, touch screen, mouse, trackpad, buttons or the like. The experience of a computing device user can be affected by feedback generated during actuation of the input component or components, such as resistance to, smoothness of, and range of movement, among others. Typically, users find certain combinations of touch-based feedback more pleasing to the touch than others. In addition, users often find compact and sleek designs more aesthetically appealing from a visual standpoint.

Although popular, a computer mouse tends to require a flat and rigid surface on which to move. It has thus become common practice to provide a mouse alternative, such as a trackpad or touchpad, in mobile computing devices, such as laptop computers, portable media players, and so forth. A conventional touchpad assembly typically includes operational circuitry enclosed within an outer housing, as well as a touch sensitive surface exposed to receive finger swipes, gestures, clicking actions, or other touch events provided by the user. In this way, a typical mobile computing device can have the option of providing a keyed input, such as that provided by a keyboard or keypad, as well as a touchpad in lieu of a mouse.

Unfortunately, the design and manufacture of relatively complex components, such as touchpads, is not always simple and straightforward. For example, while sleek and compact designs that are visually appealing tend to be desirable, such designs tend to result in relatively compact enclosures that leave little room for a wide range of movement. In addition to simple touch detection at an exposed surface, some touchpad designs can also require some form of stronger force sensing, particularly where a built-in button click action function is desired. In fact, the implementation of some types of designs and features to help detect such a built-in button click action on a compact touchpad have proven to be difficult.

While many designs and techniques used with respect to assembling computing system components have generally worked well in the past, there is always a desire to provide further designs and techniques for the assembly of computer systems and components that are reliable and aesthetically pleasing. In particular, what is desired are improved designs and techniques that enable the manufacture of compact touchpads having the ability to detect surface touches as well as stronger click action actuations by a user.

SUMMARY

The present application describes various embodiments regarding systems and methods for the manufacture of compact computing and other electrical devices that are able to detect reliably downward click action actuations by a user. This can be accomplished at least in part through the use of devices that employ one or more dome loaded sensors that utilize diaphragms. In one exemplary aspect, the computing or electrical device takes the form of a laptop computer, and the specific component being assembled can be a built-in touchpad for the laptop computer. The manufacture of such touchpads or other relevant electrical device components utilizing diaphragms can involve the use of a gimbal press that is adapted to apply pressure evenly around the circumference of the diaphragm, such that the diaphragm can be properly glued to a rigid component, such as a printed circuit board.

In various embodiments, a computing device can include an outer housing enclosing a plurality of operational components therein, a processor located within the outer housing and adapted to process inputs from a user and provide output to the user, and a touchpad in communication with the processor and accessible to the user. The touchpad can include an active surface and a plurality of diaphragms installed therewithin, with the plurality of diaphragms being adapted to permit the touchpad to sense readily and reliably downward force inputs from the user at the active surface. The plurality of diaphragms can be evenly glued to an internal flat surface within the touchpad about a circumferential edge portion of the diaphragms, and such an even gluing can be accomplished by way of a gimbal press.

In various further embodiments, a gimbal press adapted to install diaphragms can include a force delivery component adapted to deliver a force, an upper plate coupled to the force delivery component and adapted to accept the force therefrom, a lower plate having a ball bearing that accepts the force from the upper plate, and a flexible ring member that acts to center the upper and lower plates with respect to each other while still permitting some amount of relative tilt and relative rotation between the upper and lower plates. The upper plate can have an internal depression and a first plurality of interlocking features having grooves extending therethrough, while the lower plate can accept the force via the internal depression, and also includes a second plurality of interlocking features having grooves extending therethrough and an exterior surface at which the force is evenly distributed. The flexible ring member can be installed through the grooves in the first plurality of interlocking features and the grooves in the second plurality of interlocking features.

In various detailed embodiments, the gimbal press can further include a compliant annular component or washer placed proximate the exterior surface of the lower plate, wherein the compliant annular component is adapted to match the specific shape of an external diaphragm being glued to an external flat surface. Each plurality of interlocking features can comprise four interlocking features. Further, the exterior surface of the lower plate can be flat and circular in shape. The flexible ring member can be a rubber band, for example. The gimbal press can be adapted to apply pressure to an external diaphragm against an external flat surface during a gluing process. In some embodiments, the upper plate pivots and rotates relative to the lower plate via the ball bearing. In addition, each of the first and second pluralities of interlocking features can extend away from their respective upper and lower plates, and can be dimensioned such that they intersperse with each other when the upper and lower plates are brought together.

In still further embodiments, various methods of manufacturing a computer trackpad are provided. Pertinent process steps can include assembling a gimbal press having an upper plate and a lower plate, applying adhesive to a diaphragm or a flat surface to which the diaphragm is to be adhered, locating the diaphragm against the flat surface, placing the gimbal press against the diaphragm, and applying force evenly to the diaphragm via the gimbal press. The steps of applying, locating, placing and applying can preferably be repeated for a plurality of separate diaphragms. In addition, the step of assembling a gimbal press can include placing the upper plate atop a ball bearing at the lower plate, installing a compliant band within grooves located at both plates, and placing a compliant annular component proximate a flat exterior surface of the lower plate, wherein the compliant annular component is adapted to match the specific shape of the diaphragm. Further, the step of assembling can result in centering the upper and lower plates with respect to each other while still permitting some amount of relative tilt and relative rotation between the upper and lower plates.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive systems and methods for providing the manufacture of touchpads having diaphragm based actuators. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The present disclosure generally relates to various computer components, as well as manufacturing systems and processes adapted to assemble computer components. In particular, the design, system and manufacture of a touchpad or trackpad for an electronic device or system is provided. Although the following specific embodiments have been described with respect to a computer trackpad or touchpad, such as a built-in touchpad for a laptop computer or stand alone separate touchpad device, it will be readily appreciated that other computer components and processes may be similarly applicable without departing from the inventive features described herein and claimed below. For example, press-fits, screws, rivets or other fasteners might be used. Also, manufacturing steps such as cutting, separating or component finishing may be applicable. Furthermore, the disclosed touchpad assembly or other components can also be designed and used as built-in components for desktop or server based computing systems, and not just laptops, other portable computing systems, or stand alone devices. Further alternative embodiments will be readily appreciated by those skilled in the art.

Figure 1A:
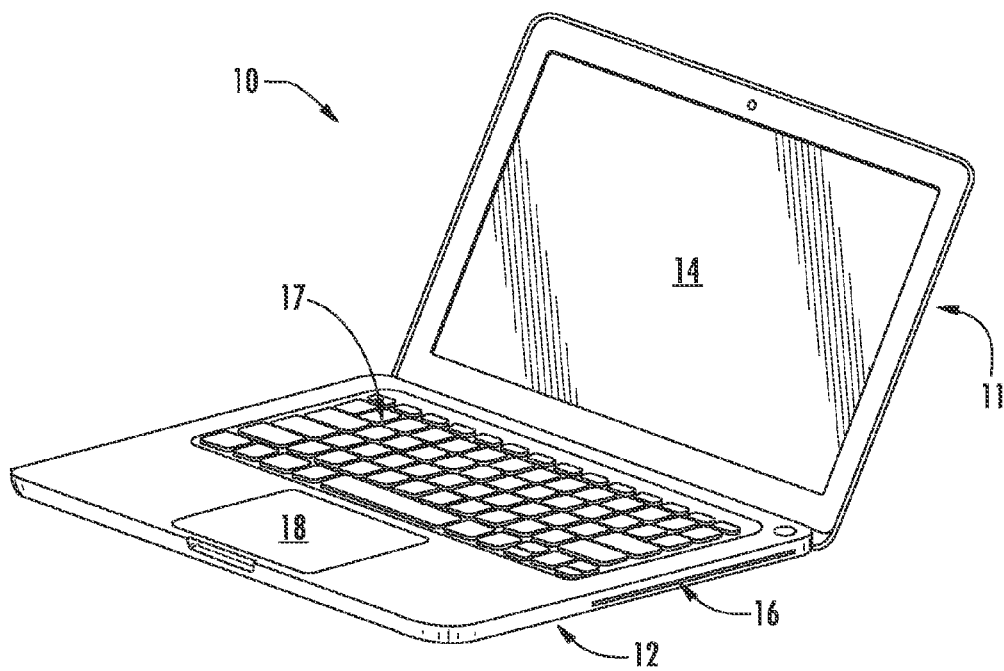
FIG. 1A illustrates in front perspective view an exemplary portable computing system having a touchpad in an open configuration according to one embodiment of the present invention.

Referring first to FIG. 1A, an exemplary portable computing system is shown in front perspective view. Portable computing system 10 can be, for example, a laptop computer, and can include a lid portion 11 pivotally connected to a base portion 12. Lid portion 11 can include various components, such as a display 14, as will be readily appreciated. Base portion 12 can also include various components, such as an internal processor (not shown), disk drive 16, keyboard 17 and built-in touchpad 18, among other possible components.

Figure 1B:
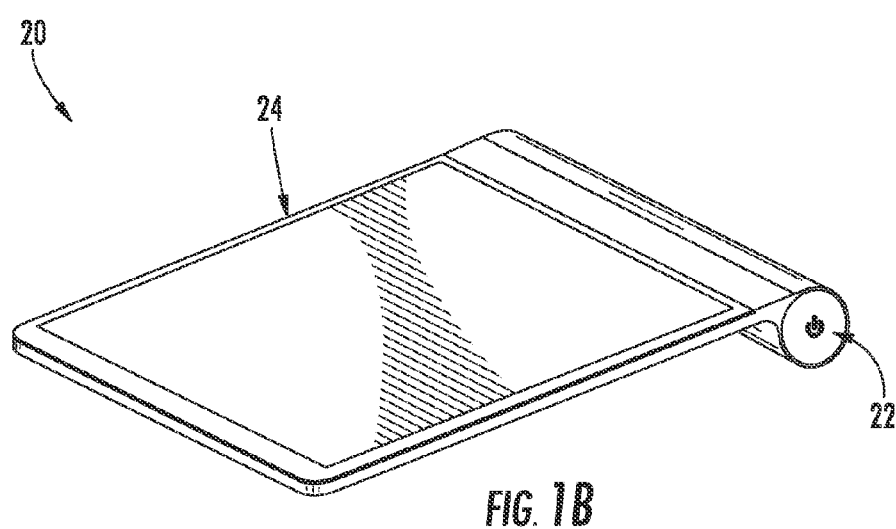
FIG. 1B illustrates in front perspective view an exemplary stand alone touchpad according to one embodiment of the present invention.

Continuing with FIG. 1B, an exemplary stand alone touchpad device is similarly illustrated in front perspective view. Stand alone touchpad 20 can include items such as an on switch 22 and an active surface 24 adapted to accept inputs from a user. In the case of both built-in touchpad 18 and stand alone touchpad 20, either device or component can be configured to receive finger gestures and other user inputs, such as at an upper surface. A finger gesture can include, for example, touch events from more than one finger applied in unison. The gesture can also include a single finger touch event such as a swipe or a tap. Other user inputs can include a substantial downward depression on the upper surface of the touchpad, such that a button actuation event is detected.

In many types of touchpads, it can be challenging to design these devices such that they are compact and yet able to detect and distinguish accurately between surface swipes and substantial downward depressions in the form of button actuations. Although it can be preferable in many instances to utilize dome loaded switches as one way of detecting and distinguishing a downward actuation force versus a simple surface swipe, the use of such dome loaded switches has been found to be difficult in many touchpads. In particular, traditional dome loaded switches tend to utilize diaphragms, which can be particularly difficult to install in a reliably performing manner in touchpads, particularly those that tend to be more compact, sensitive and aesthetically pleasing.

Figure 2A:
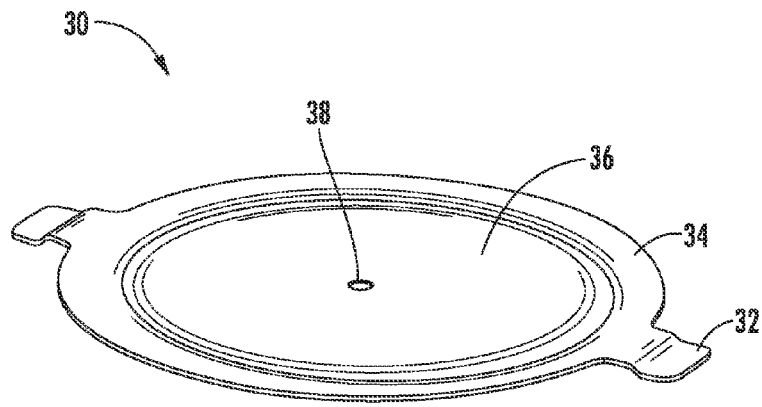
FIG. 2A illustrates in front perspective view an exemplary flattened dome loaded type diaphragm according to one embodiment of the present invention.

Turning next to FIG. 2A, a flattened dome loaded type diaphragm is shown in front perspective view. Diaphragm 30 is circular in nature and includes a plurality of tabs 32 that can be used to assist in the exact placement of the diaphragm during assembly. Diaphragm 30 also includes a flattened outer ring portion 34 that can be used to glue the diaphragm to a touchpad printed circuit board ("PCB") or other flat and sturdy component (not shown). An inner portion 36 of the diaphragm can be adapted to flex in a general dome shape to function as part of a dome loaded switch. Opening 38 can be located at or near the center of diaphragm 30, such that air or other pertinent fluid can freely pass into the volume defined by the diaphragm dome during actuation or de-actuation of the diaphragm.

Figure 2B:
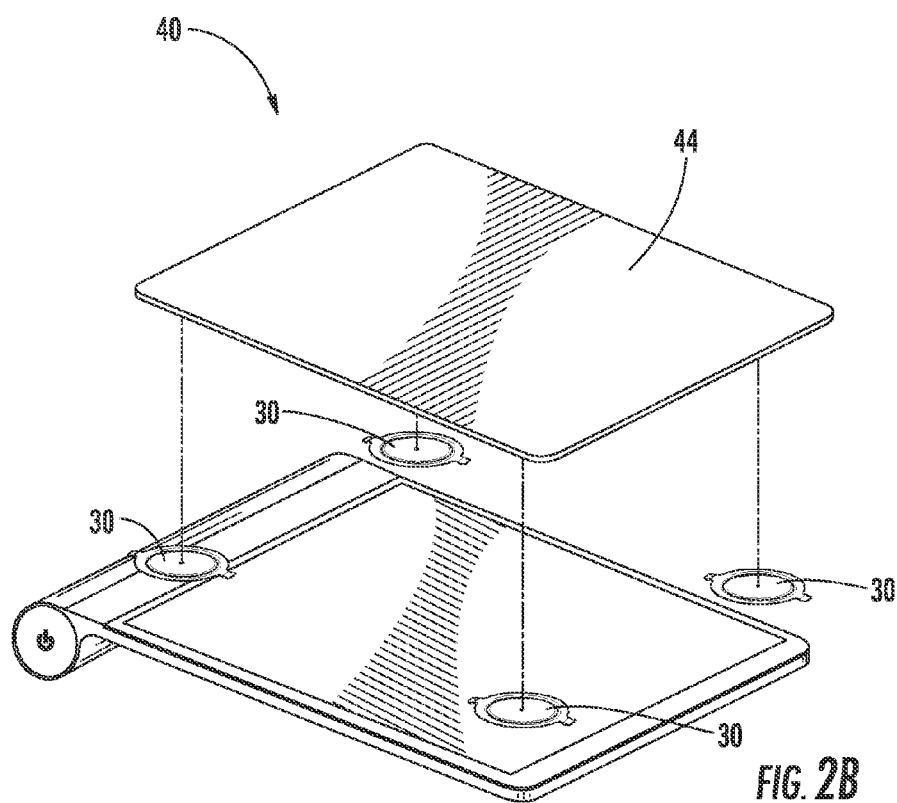
FIG. 2B illustrates in partially exploded perspective view an exemplary stand alone touchpad having multiple diaphragms as shown in FIG. 2A according to one embodiment of the present invention.

FIG. 2B illustrates in partially exploded perspective view an exemplary stand alone touchpad having multiple diaphragms as shown in FIG. 2A. Touchpad 40 can be substantially similar to touchpad 20 above, and can similarly include an active surface 44 adapted to accept inputs from a user. Touchpad 40 can be generally square or rectangular in shape, although other shapes may also be used, as may be desired. A diaphragm 30 can be embedded within touchpad 40 at each of the four corner regions of the touchpad, with each diaphragm being adapted to function as a dome loaded switch. That is, when a significant downward force is incumbent upon the active surface 44 of touchpad 40, then one or more of the four diaphragms 30 will deflect enough such that an actuation of a dome switch including the diaphragm is made, and an effective button click action is detected. Although four diaphragm type dome switches are shown, it will be readily appreciated that more or fewer switches can be used, as may be desired.

There can be some difficulty in the manufacture of such diaphragm type switches in some cases. As will be readily appreciated, a dome loaded diaphragm component is typically installed by gluing or otherwise fastening it to a sturdier internal component having a flat surface, such as a PCB. Without evenly applied pressure during the gluing process, however, the glue tends to cure unevenly between the diaphragm and flat surface. This in turn results in poor control in the distance between the domed portion of the diaphragm and the flat surface, which can then cause the diaphragm to perform poorly as a force sensor. Unfortunately, the ability to control and evenly apply pressure during the gluing and glue curing process for diaphragms within a compact touchpad module can be difficult, particularly during the mass manufacture of products.

Figure 3A:
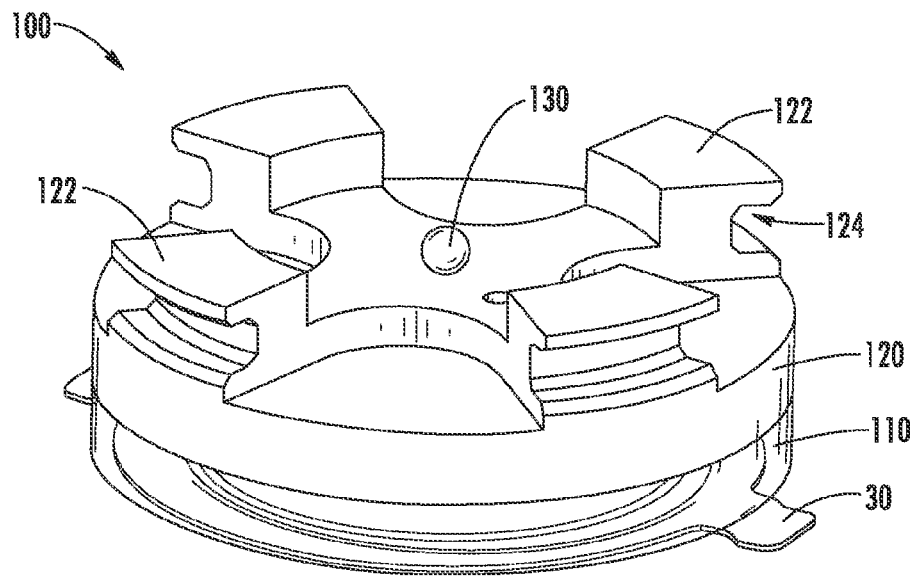
FIG. 3A illustrates in front perspective view an exemplary lower portion of a gimbal press positioned atop a diaphragm as shown in FIG. 2A according to one embodiment of the present invention.
Figure 3B:
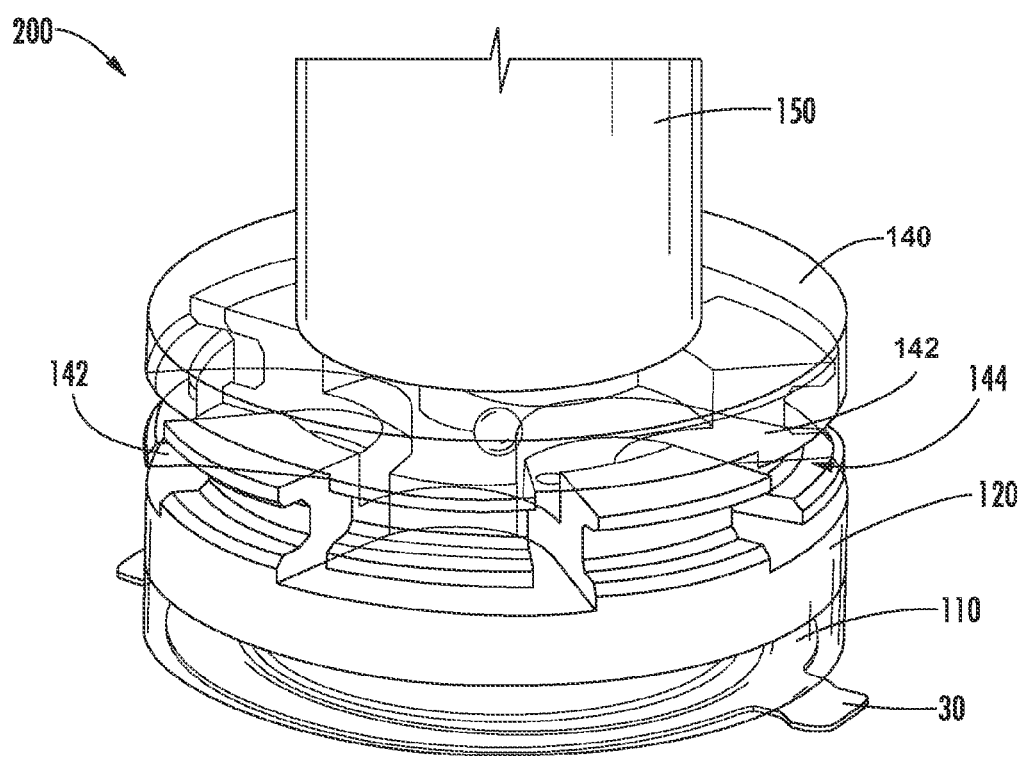
FIG. 3B illustrates in front perspective view an exemplary upper portion of a gimbal press engaged with the lower portion of a gimbal press and diaphragm of FIG. 3A according to one embodiment of the present invention.

Turning now to FIGS. 3A and 3B, various gimbal press components adapted to apply even pressure to a diaphragm are shown in front perspective views. In general, a gimbal press is a specialized fixture that is adapted to apply pressure evenly to a diaphragm during a gluing or other adhering process. Again, without even pressure, the glue cures unevenly between the diaphragm and the flat surface, causing the distance between the diaphragm and the flat surface to be poorly controlled, which in turn results in the diaphragm not performing well for its intended use as a force sensor. FIG. 3A depicts an exemplary lower portion of a gimbal press positioned atop a diaphragm, while FIG. 3B shows an exemplary upper portion of a gimbal press engaged with the lower portion of the gimbal press.

Gimbal press lower portion 100 is adapted to press firmly and evenly against diaphragm 30 during a gluing or other adhering process. The lower portion can include a compliant annular washer 110 or other force delivery component adapted to contact the upper surface of the diaphragm directly. Compliant washer 110 can be formed from a soft plastic or rubber material, for example, although other suitable materials can also be used. Rigid lower plate 120 is adapted to contact the compliant washer 110 or other force delivery component, and can be formed from steel, for example, although other suitable materials can also be used. Both compliant washer 110 and rigid lower plate 120 can be generally circular in nature, so as to match the general geometry of the diaphragm 30. Lower plate 120 can include a plurality of interlocking features 122 having outer grooves 124 running therethrough. In addition, a ball bearing 130 can be located at or near the center of lower plate 120. Interlocking features 122 can be integrally formed with or affixed to lower plate 120, such as by gluing, press fit, or other suitable fixation techniques. Similarly, ball bearing 130 can be integrally formed with or affixed to lower plate 120.

Force is generally directed downward on diaphragm 30 via compliant annular washer 110, which in turn receives force from lower plate 120. In turn, downward force is delivered to lower plate 120 via ball bearing 130, which in turn receives force from rigid upper plate 140. With force being delivered from upper plate 140 to lower plate 120 via ball bearing 130, this results in the ball bearing acting as a gimbal, such that any slight offset or misdirection in the downward force vector being delivered to upper plate 140 will not be translated to lower plate 130. That is, an imperfectly delivered force is evenly distributed across the full outer circumference of diaphragm 30 due to the force being delivered through the upper plate 140 to ball bearing 130 to lower plate 120 gimbal press arrangement. This arrangement allows the plates both to tilt and to rotate somewhat with respect to each other, such that any imperfectly delivered force is evenly distributed onto the compliant washer and then the diaphragm.

As shown in FIG. 3B, upper plate 140 similarly includes a plurality of interlocking features 142 having outer grooves 144 running therethrough. Upper plate 120 can similarly be formed from steel, although again other suitable materials can also be used. As in the case of the lower plate, interlocking features 142 can be integrally formed with or affixed to upper plate 140, such as by gluing, press fit, or other suitable fixation techniques. Each of interlocking features 122 and 142 on lower and upper plates 120 and 140 respectively are adapted to intersperse with each other, such that outer grooves 124 and 144 generally align. Due to the general alignment of grooves 124 and 144, a rubber band or other similarly compliant ring member (shown below) can be stretched about and located within these grooves, such that lower and upper plates 120 and 140 are loosely held together and relatively centered with respect to each other within a plane defined by the plates.

As shown, there can be a significant gap between each adjacent pair of interlocking features 122 and 142 when the upper plate and lower plate are put together, such that some amount of relative rotational play between the upper and lower plates can take place. In addition, some amount of tilt play between the upper and lower plates 140 and 120 can take place due to the primary point of contact between the plates being the centrally located ball bearing 130. A downward force can be exerted onto the fully assembled gimbal press 200 by way of shaft 150, which can be integrally formed with or coupled to the backside of upper plate 140.

Figure 4:
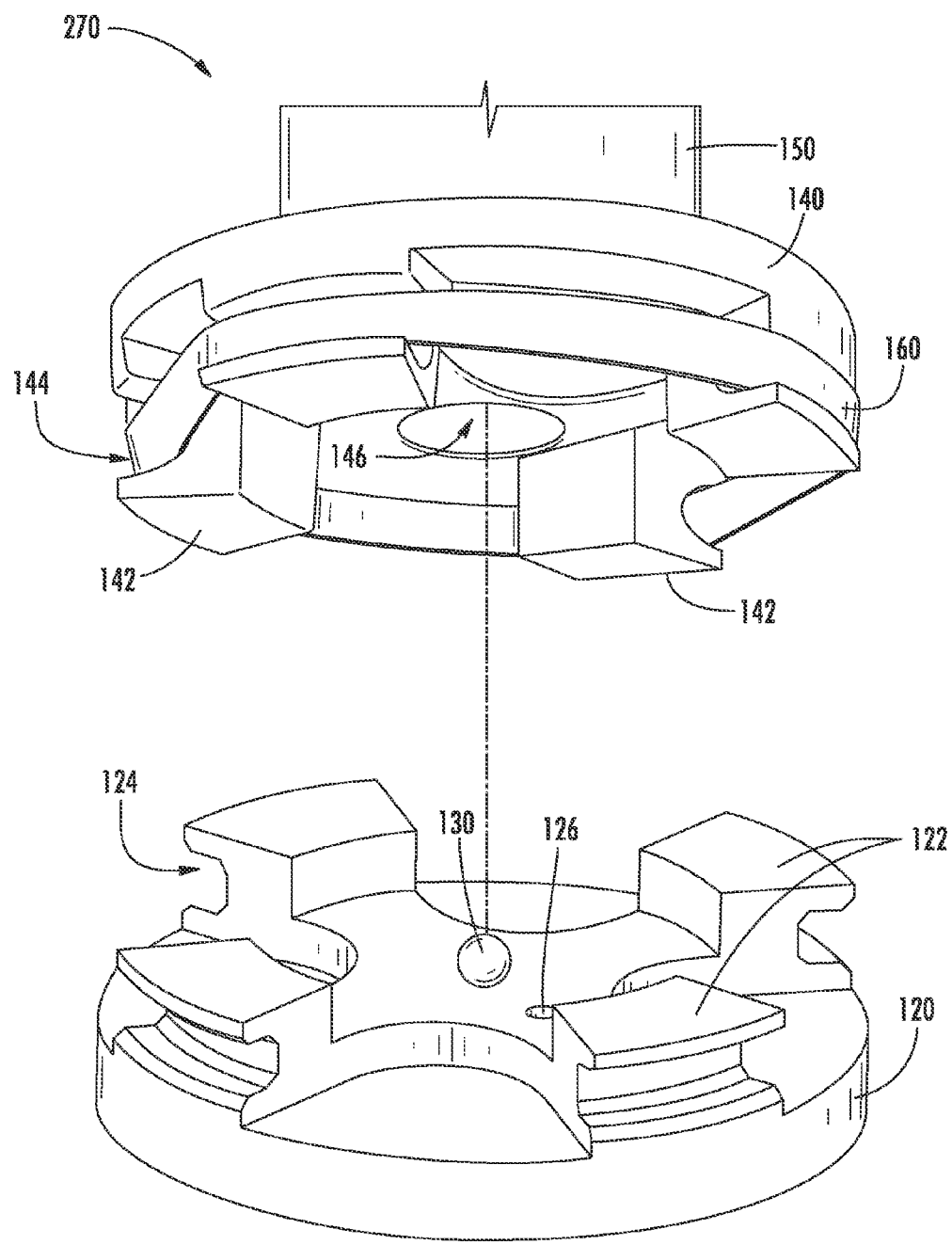
FIG. 4 illustrates in side perspective view an exemplary partially disassembled gimbal press according to one embodiment of the present invention.

Moving next to FIG. 4, an exemplary partially disassembled gimbal press is shown in side perspective view.

Again, gimbal press 270 can include a shaft 150 or other force delivery component that is formed with or coupled to upper plate 140. Upper plate 140 can include a plurality of interlocking features 142 having outer grooves 144 formed therein, such that a rubber band 160, o-ring or other flexible ring member can be placed into the grooves. A concave depression 146 can be formed at or near the center and underside of upper plate 140, with this depression being adapted to receive and deliver force to ball bearing 130.

As noted above, ball bearing 130 can be integrally formed with, affixed to or otherwise coupled to lower plate 120, which can also has a plurality of interlocking features 122 having outer grooves 124 formed thereon. Grooves 124 can also be used for accepting rubber band 160 or other flexible ring member, with the rubber band being stretched outward and released into the grooves 124 when the upper and lower plates are brought together. Although four interlocking features are formed on each of upper and lower plates 140 and 120, it will be readily understood that more or fewer interlocking features can be used, as may be desired. Opening 126 can serve to allow the free passage of air or other pertinent fluid during the gluing or other assembly processes. Again, the interlocking features 124, 144 and rubber band 160 serve to keep the upper plate 140 centered and biased against the ball bearing 130.

Figure 5A:
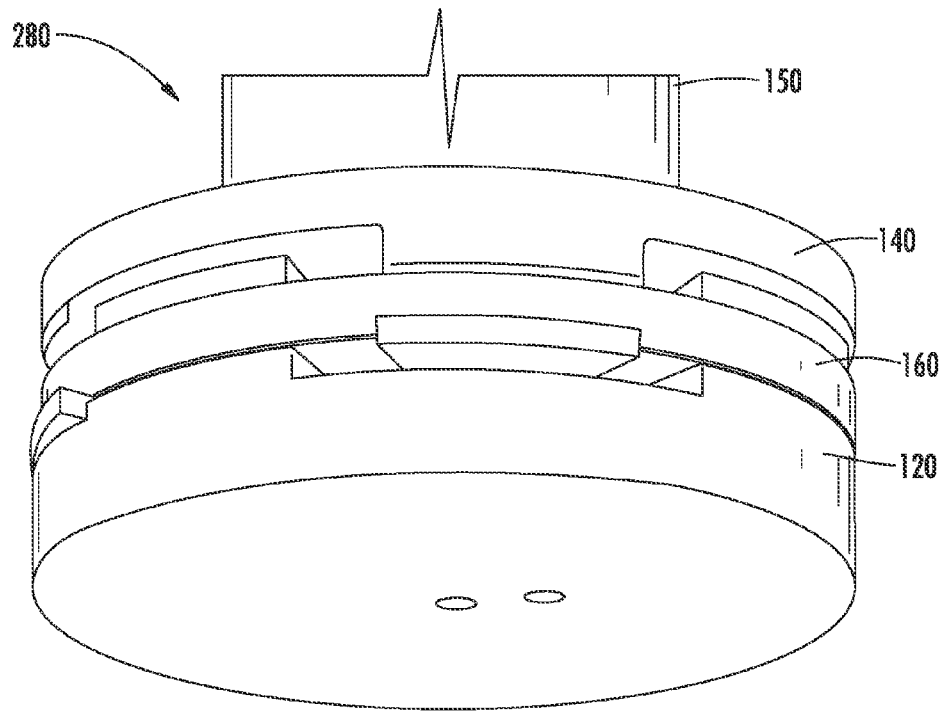
FIG. 5A illustrates in side perspective view the exemplary gimbal press of FIG. 4 as being assembled according to one embodiment of the present invention.
Figure 5B:
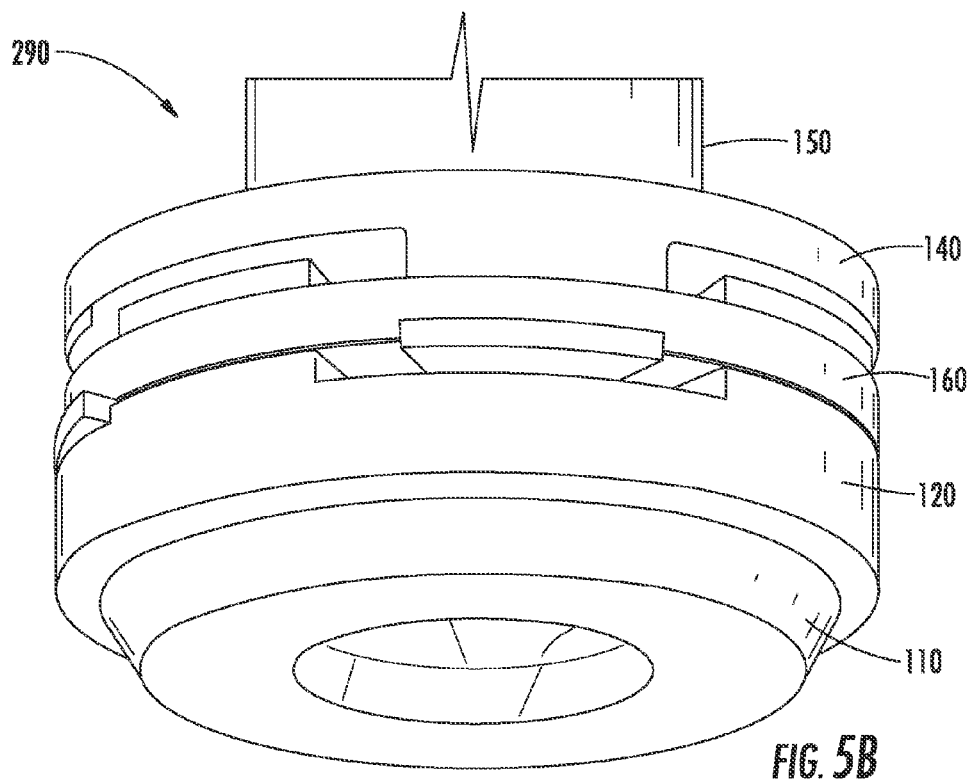
FIG. 5B illustrates in side perspective view the exemplary gimbal press of FIG. 5A with a compliant washer placed thereagainst according to one embodiment of the present invention.

Continuing with FIG. 5A, the exemplary gimbal press of FIG. 4 is shown as being assembled. Assembled gimbal press 280 can again include a force delivery shaft 150 coupled to upper plate 140, which is coupled to lower plate 120 by way of rubber band 160 running through grooves on the interlocking features of both the upper and lower plates. In FIG. 5B, the exemplary gimbal press of FIG. 5A is shown with a compliant washer placed thereagainst. Fully assembled gimbal press 290 can also include a compliant annular washer 110 placed against a flat exterior surface of lower plate 120. When force is then delivered downward from shaft 150, this force is evenly distributed about the outer circumferential region of washer 110 due to the gimbal effect of the ball bearing and upper and lower plates, as set forth above.

Figure 6:
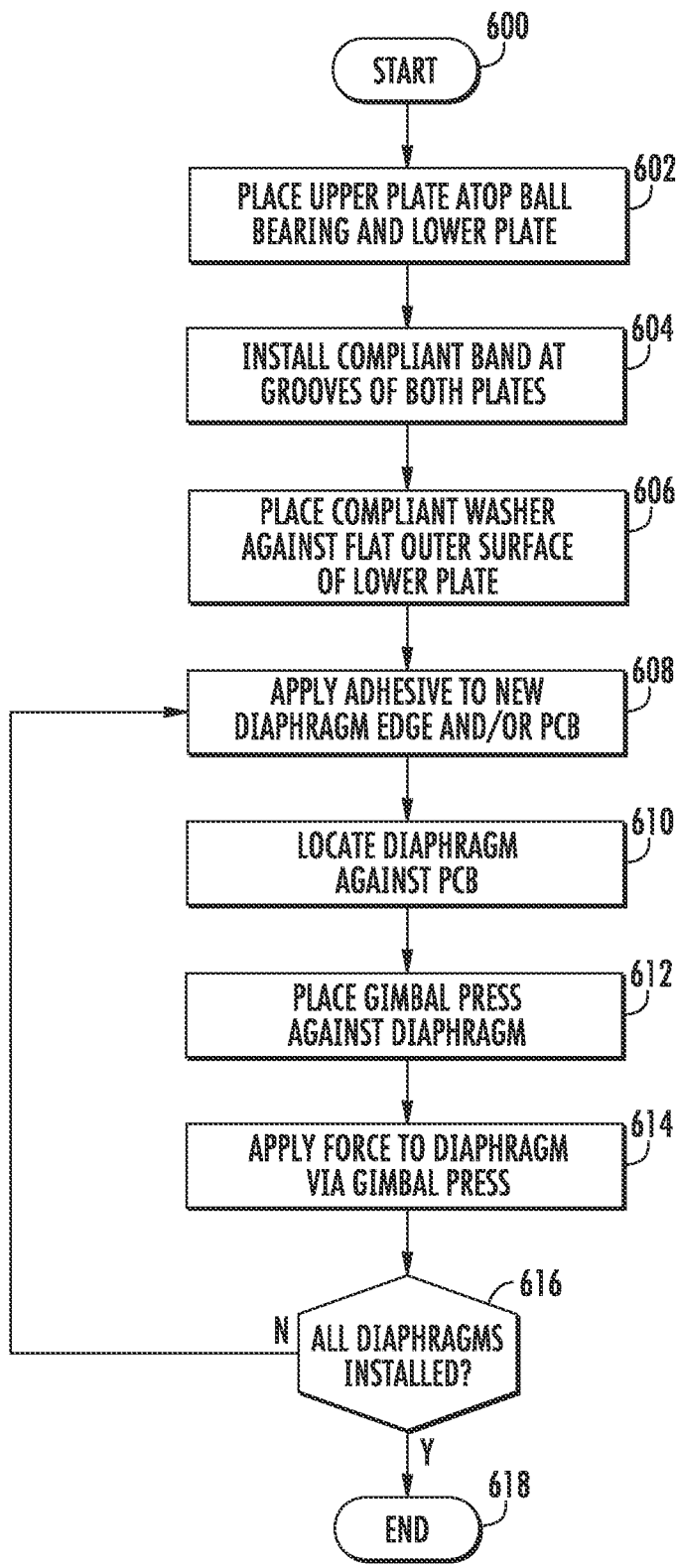
FIG. 6 provides a flowchart of an exemplary method of manufacturing a computer touchpad module according to one embodiment of the present invention.

Moving lastly to FIG. 6, a flowchart of an exemplary method of manufacturing a computer touchpad module is provided. It will be understood that the provided steps are shown only for purposes of illustration, and that other steps may be included in the process, as may be desired. Furthermore, the order of steps may be changed where appropriate and not all steps need be performed in various instances. For example, step 612 can be performed before, after, or in parallel with either of steps 608 or 610, as may be desired.

After a start step 600, the formation of a gimbal press begins at process step 602, which involves placing an upper plate atop a ball bearing and lower plate. This can involve the use of upper and lower plates having interlocking features and outer grooves, as disclosed in greater detail above. At process step 604, a rubber band, o-ring or other compliant type band can be installed through the grooves in the upper and lower plates, after which a compliant washer can be placed against a flat outer surface of the lower plate at process step 606. This compliant washer can be affixed to or simply held against the surface of the lower plate.

At process step 608, an adhesive or glue can be applied to the outer circumferential rim or portion of the diaphragm. Alternatively, the adhesive or glue can be placed on the PCB or other flat external surface to which the diaphragm is to be affixed. If desired, adhesive can be applied to both the diaphragm and external flat surface. The diaphragm is then appropriately located against the PCB or other component flat surface at process step 610, and the formed gimbal press is placed against the diaphragm at process step 612. At subsequent process step 614, force is then applied to the diaphragm via the gimbal press, which results in the force being evenly applied about the circumferential edge portion of the diaphragm.

After the diaphragm has been installed in this manner, an inquiry can then be made at decision step 616 as to whether all diaphragms have been installed. If not, then the method reverts to process step 608, where steps 608 through 616 are then repeated for a new diaphragm. If all diaphragms are determined to be installed at decision step 616, however, then the method ends at end step 824.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of manufacturing a computer trackpad, the method comprising:
   placing an upper plate of a gimbal press atop a ball bearing at a lower plate of the gimbal press;
   installing a compliant band within grooves formed in interlocking features on a circumference along both plates, wherein the compliant band is a flexible ring member;
   adhering a diaphragm to a flat surface using the gimbal press by:
   applying adhesive to the diaphragm or to the flat surface;
   locating the diaphragm against the flat surface;
   placing the gimbal press against the diaphragm; and
   applying force evenly to the diaphragm via the gimbal press.

2. The method of claim 1, wherein the steps of applying, locating, placing and applying are repeated for a plurality of separate diaphragms.

3. The method of claim 1, further comprising:
   placing a compliant annular component proximate a flat exterior surface of the lower plate, wherein the compliant annular component is adapted to match the specific shape of the diaphragm.

4. The method of claim 1, wherein installing the compliant band within the grooves formed along the interlocking features comprises installing a rubber band or an O-ring through the grooves in the upper plate and the lower plate.

5. A method of manufacturing a computer trackpad, the method comprising:
   placing a diaphragm over a flat surface including a printed circuit board;
   applying adhesive to a circumferential edge portion of the diaphragm or the flat surface to which the diaphragm is to be adhered, leaving a central portion of the diaphragm free of adhesive;
   applying a force on the circumferential edge portion of the diaphragm by pressing a first plate in a gimbal press against the diaphragm;
   allowing the first plate to tilt and rotate about a second plate in the gimbal press; and
   aligning the first plate with the second plate with a compliant band overlapping interlocking features in the first plate and the second plate, the compliant band comprising a flexible ring member, and defining a circumference of the first plate and the second plate.

6. The method of claim 1, further comprising:
centering the upper and lower plates with respect to each other; and
permitting some amount of relative tilt and relative rotation between the upper plate and the lower plate.

7. The method of claim 1, further comprising flexing an inner portion of the diaphragm to form a dome-shaped diaphragm.

8. A method of manufacturing a computer trackpad, the method comprising:
assembling a gimbal press having an upper plate configured to tilt and to rotate about a ball bearing located at a lower plate;
applying adhesive to a circumferential edge portion of a diaphragm or an area of a flat surface overlapping the circumferential edge portion of the diaphragm, wherein the diaphragm is to be adhered to the flat surface, leaving a central portion of the diaphragm free of adhesive;
locating the diaphragm against the flat surface;
placing the gimbal press against the diaphragm; disposing a flexible ring member in a groove formed along interlocking features around a circumference of the upper plate and the lower plate; and
applying force evenly to the diaphragm via the gimbal press.

9. The method of claim 8, wherein the steps of applying, locating, placing and applying are repeated for a plurality of diaphragms.

10. The method of claim 9, further comprising fixing the plurality of diaphragms to an internal flat surface within the computer trackpad.

11. The method of claim 8, further comprising placing a compliant annular component proximate to an exterior surface of the lower plate.

12. The method of claim 8, further comprising aligning interlocking features in the upper plate with interlocking features in the lower plate.

13. The method of claim 12, wherein aligning interlocking features comprises centering the upper plate relative to the lower plate via a ball bearing.

14. The method of claim 8, wherein applying force evenly comprises contacting an upper surface of the diaphragm with a force delivery component coupled to the upper plate.

15. The method of claim 8, further comprising adapting an inner portion of the diaphragm to flex into a dome shape.

16. The method of claim 5, further comprising holding a compliant washer against a flat surface on the first plate.

17. The method of claim 5, wherein allowing the first plate to tilt and rotate about the second plate comprises pivoting the first plate about a ball bearing placed substantially at the center of the first plate.

18. The method of claim 5, further comprising allowing a fluid to move in and out of a space formed between an inner portion of the diaphragm formed as a dome shape and the flat surface.

19. The method of claim 5, wherein allowing a fluid to move comprises allowing the fluid through an opening located substantially at the center of the diaphragm, and through an opening in the first plate of the gimbal press.

* * * * *